United States Patent [19]
George, Jr.

[11] Patent Number: 6,116,275
[45] Date of Patent: Sep. 12, 2000

[54] ANIMAL, HUMAN AND INDUSTRIAL WASTE DISTRIBUTION SYSTEM

[76] Inventor: John A. George, Jr., 110 Iowa St., St. Marys, Iowa 50241

[21] Appl. No.: 09/004,890

[22] Filed: Jan. 9, 1998

[51] Int. Cl.[7] ....................................................... B05B 3/18
[52] U.S. Cl. ............................ 137/580; 285/272; 285/275; 111/118; 239/724
[58] Field of Search ..................................... 137/580, 581, 137/799; 285/272, 275; 111/118; 239/722, 724

[56] References Cited

U.S. PATENT DOCUMENTS

| | | | |
|---|---|---|---|
| 1,696,134 | 12/1928 | Algyre | 285/272 |
| 1,796,159 | 3/1931 | Pallady | 285/272 |
| 3,608,825 | 9/1971 | Reinke | 137/581 X |
| 3,942,722 | 3/1976 | Ede | 239/724 X |
| 4,034,686 | 7/1977 | Collins | 111/118 |
| 4,570,440 | 2/1986 | Doran | 285/275 X |
| 4,848,400 | 7/1989 | Grant et al. | 137/581 X |

FOREIGN PATENT DOCUMENTS 1139792  7/1957  France ................................... 137/581

*Primary Examiner*—John Rivell
*Attorney, Agent, or Firm*—Zarley, McKee, Thomte, Voorhees & Sease

[57] ABSTRACT

The outlet hose from the lagoon pump is telescopically connected to the waste injector inlet tube such that the outlet hose is free to rotate and maintain itself in a straight condition by the fluid pressure in the outlet hose during use. A tow swivel is provided which allows the tractor and waste injector to pull the outlet hose back and forth across the field without interfering with the free rotation of the outlet hose relative to the inlet tube.

18 Claims, 4 Drawing Sheets

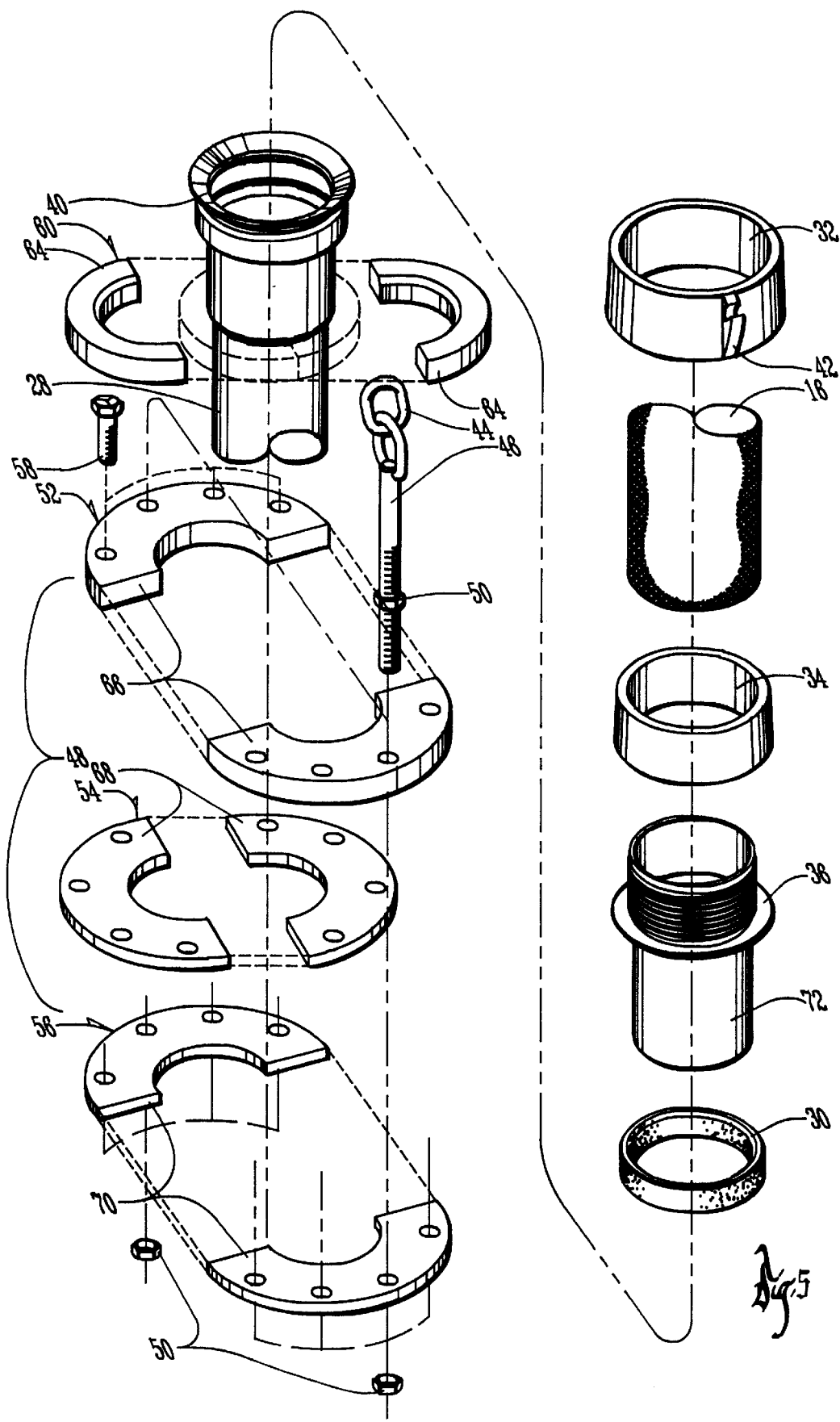

ANIMAL, HUMAN AND INDUSTRIAL WASTE DISTRIBUTION SYSTEM

BACKGROUND OF THE INVENTION

Large scale hog production, municipal and industrial facilities produce a substantial amount of animal and human waste which is typically stored in ground reservoirs. This waste then must be spread over farm land as fertilizer. Typically, a hose is placed in the reservoir connected to a pump which in turn connects to a waste injector pulled by a tractor which travels back and forth across the field to be fertilized all the while pulling the hose. The tractor will turn at each end of the field causing the hose to become tangled and kinked requiring disconnection from the waste injector to allow it to be straightened under the pressure of liquid waste material passing through it. Another technique for straightening the hose is to wind it up on a reel and straighten it as it is being wound onto the reel. What is needed is a way to allow the hose to keep itself straight at all times during usage without having to disconnect it or reel it in to straighten it.

SUMMARY OF THE INVENTION

This invention is directed to a tow swivel for a waste distribution system which allows the hose to automatically straighten itself as the tractor pulling the hose makes repeated turns at the ends of the field in which the waste material is being applied. The way that this is accomplished is by providing a telescopic connection between the inlet tube coming from the waste injector and the outlet hose coming from the waste lagoon pump. This telescopic connection includes a gasket for sealing purposes but the outlet hose is free to rotate relative to the stationary inlet tube, thus maintaining the outlet hose in a straightened condition throughout its use.

The hose must be pulled by the tractor carrying the waste injector and this is accomplished without interfering with the free rotation of the outlet hose. A collar is placed on the inlet tube and includes a pair of link means on opposite sides which extend along the telescopic connection between the inlet tube and the outlet hose. These links then are connected to a ring assembly embracing the outlet hose which bears against an annular shoulder rigidly connected to the outlet hose. The ring assembly includes a nylon or Teflon plate which bears against the annular shoulder allowing relative rotational movement of the outlet hose relative to the ring assembly due to the reduced friction of the nylon or Teflon material.

Since it is desirable to attach the tow swivel to an existing outlet hose, three pairs of semicircular plates are used by staggering them by 90° relative to each other so that when they are bolted together they present a unitary ring assembly.

Thus, it is seen that with the tow swivel of this invention a considerable time and expense savings will be realized by the uninterrupted spreading of waste material over farm land being fertilized. The fluid pressure in the outlet hose will maintain it in a straight condition at all times as it will be free to rotate as required to keep it straight.

BRIEF DESCRIPTION OF THE DRAWINGS

FIG. 5 is an exploded perspective view of the tow swivel component parts.

DESCRIPTION OF THE PREFERRED EMBODIMENT

Figure 1:
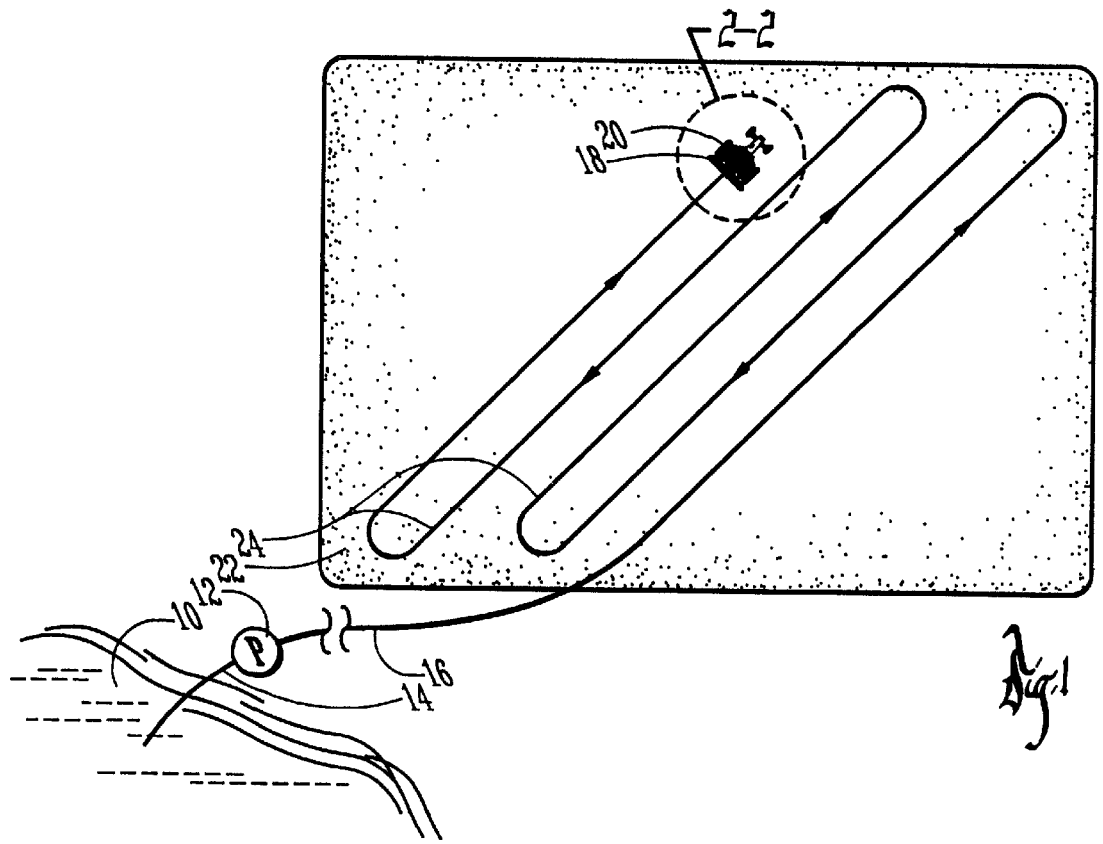
FIG. 1 is a top plan view of a waste lagoon from which waste material is being pumped to a waste injector on a tractor which is spreading the waste material over a farm field by traveling back and forth across the field while pulling the outlet hose.
Figure 2:
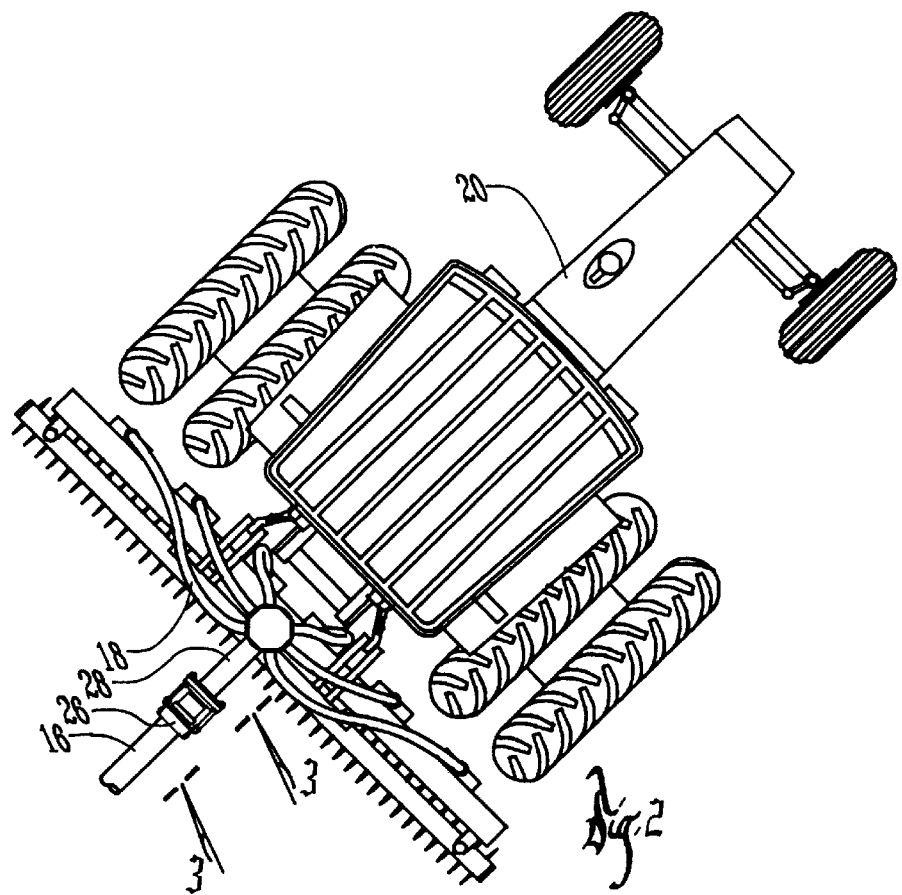
FIG. 2 is a top plan view of the tractor waste injector and tow swivel as indicated by dash line 2—2 in FIG. 1.
Figure 3:
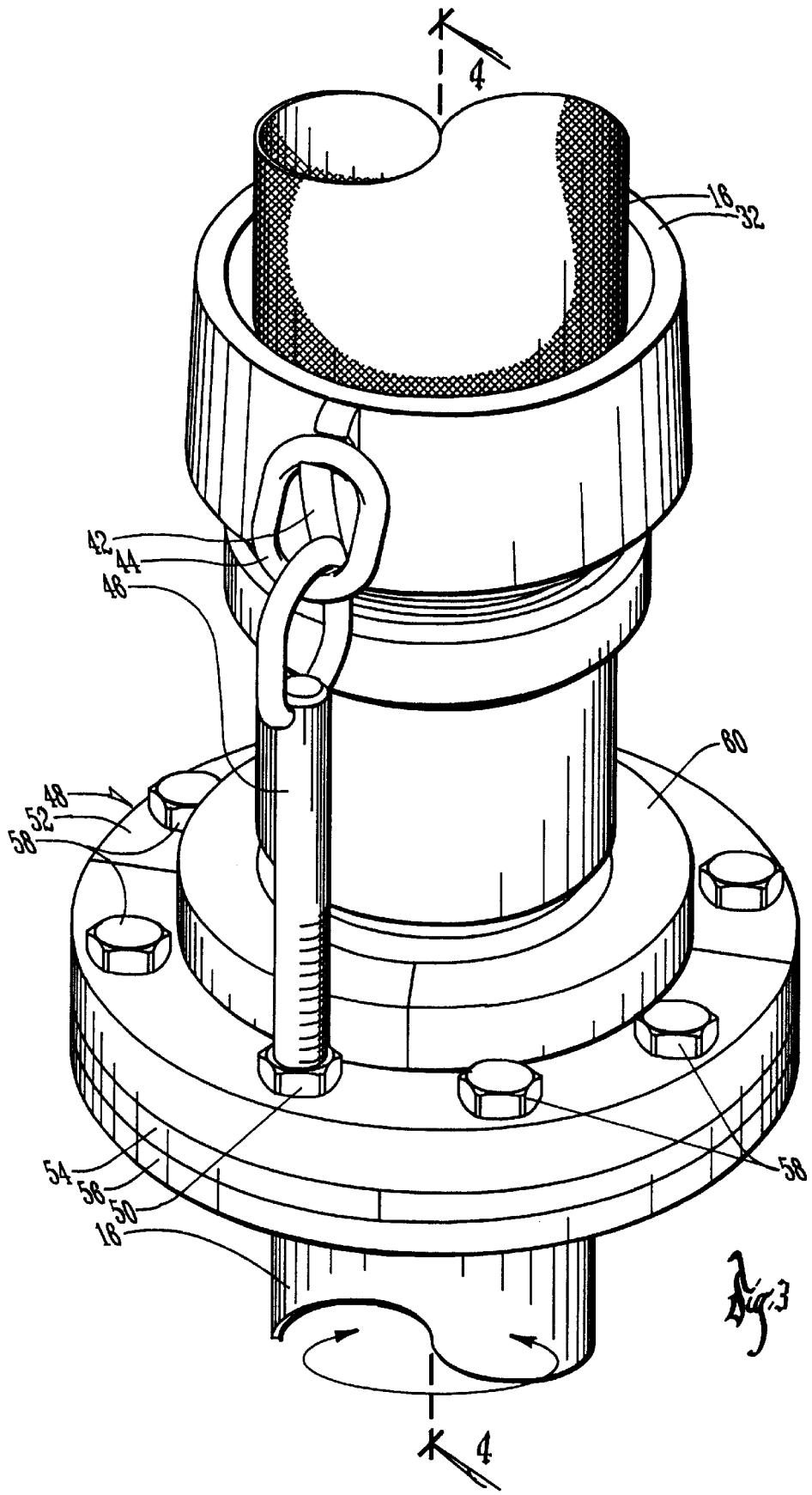
FIG. 3 is fragmentary side view of the tow swivel as taken along line 3—3 in FIG. 2.

The waste distribution system of this invention is seen in FIG. 1 and includes a waste lagoon 10 to which a pump 12 is connected through a hose 14. An outlet hose 16 is connected to the pump 12 and is pulled by and behind a waste injector 18 mounted on a tractor 20 which travels back and forth across a field 22. The turns 24 at the ends of the field 22 cause the tangling and kinking problem to which this invention is directed.

A tow swivel 26 is provided to allow the outlet hose 16 to rotate freely relative to an inlet tube 28 connected to the waste injector 18. The outlet hose 16 telescopically receives the outer free end of the inlet tube 28 and while the outlet hose 16 is free to rotate axially, it is sealed against leakage by a gasket 30.

Figure 4:
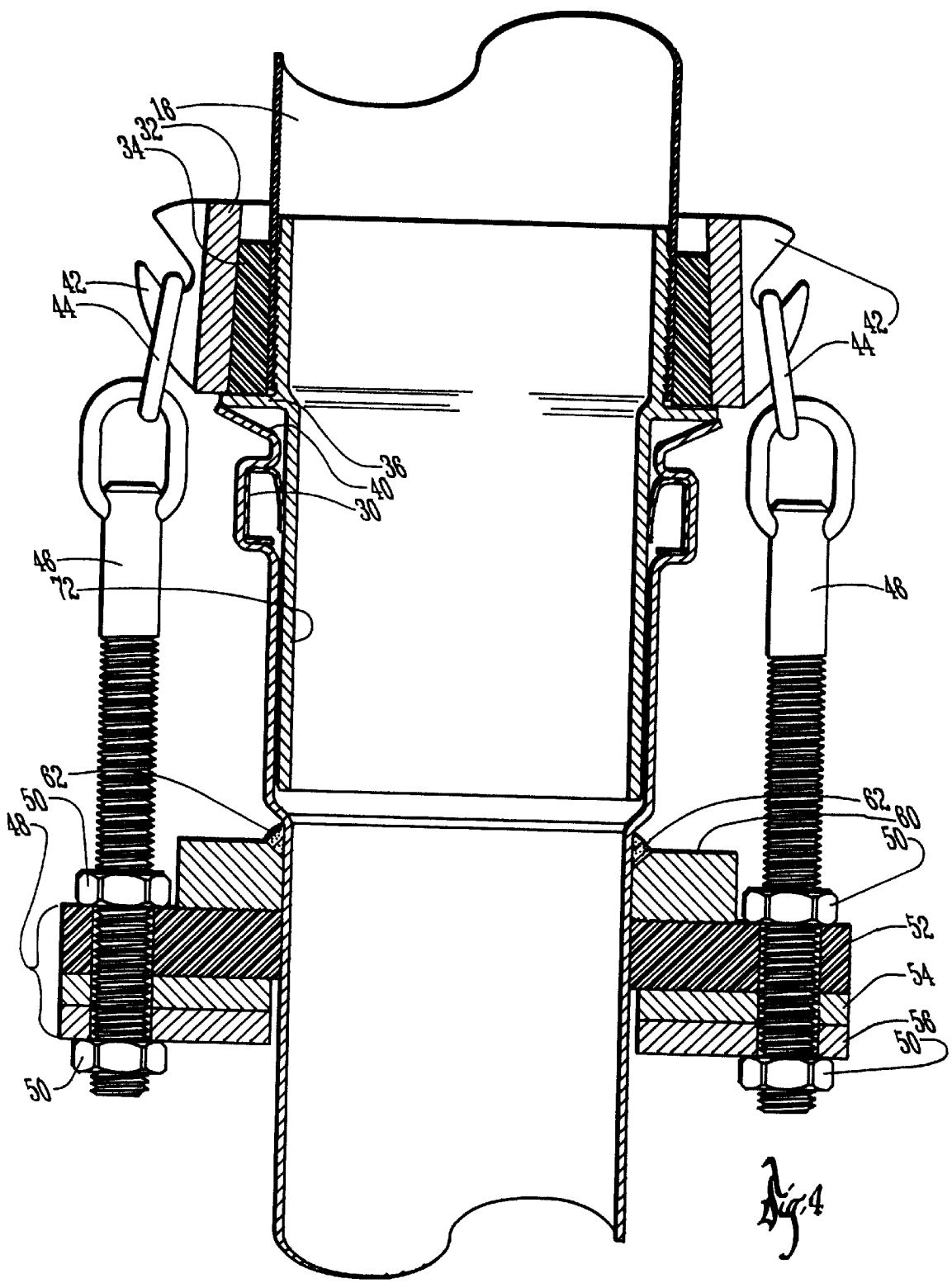
FIG. 4 is a cross-sectional view taken along line 4—4 in FIG. 3.

A collar 32 is mounted on the inlet outlet hose 16 and held tightly by an annular wedge 34. The collar 32 and annular wedge 34 bear against an annual flange 36 rigidly connected to a metal end tube member 72 as seen in FIG. 4. The flange 36 in turn bears against a flange 40 on the outer end of the inlet tube 28. The collars 32 includes a pair of hooks 42 on opposite sides to which a link chain 44 is connected. The link chain 44 includes a bolt 46 which extends through a ring assembly 48 mounted on the inlet tube 28. A pair of nuts 50 lock together three pairs of semicircular plates 52, 54 and 56 arranged in a staggered 90° relationship to each other as seen in FIG. 5. Bolts 58 further lock the three pairs of plates together to form the ring assembly which bears against an annular shoulder 60 rigidly connected to the inlet tube 28 by weldments 62. The annular shoulder 60 is seen in FIG. 5 to also comprise a pair of semicircular plates 64.

The pair of semicircular plates 52 include individual semicircular plates 66 made of nylon or Teflon to minimize friction when bearing against the annular shoulder 60, thereby allowing free rotation of the outlet hose 16 relative to the inlet tube 28. The second pair of semicircular plates 54 also include individual semicircular plates 68 while the pair of plates 56 include individual plates 70.

The outlet hose 16 is seen to include a metal end tube member 72 which is locked to the outlet hose 16 by the collar 32 wedged thereon by the annular wedge 34.

Thus, it is seen that through the use of this invention a simplified, inexpensive tow swivel has been provided for a waste distribution system that allows uninterrupted distribution of liquid waste material on a field as the waste injector travels back and forth across the field. The fluid pressure in the outlet hose 16 will automatically cause the outlet hose 16 to rotate axially as required to maintain it straight at all times, thereby avoiding the heretofore requirement of stopping and disconnecting the outlet hose to allow it to be straightened.

What is claimed is:

1. A waste distribution system including a reservoir of waste, a pump having an inlet hose connected to the reservoir and an outlet hose rotatably connected to an inlet tube on a mobile field spreader through a hose tow swivel comprising, fastening means externally positioned on said inlet tube, annular laterally outwardly extending shoulder means on said outlet hose limited against relative axial movement, collar means on said outlet hose axially outwardly of said annular shoulder for rotational engagement therewith, link means connecting said fastening means to said collar means for pulling said outlet hose while allowing said outlet hose to rotate relative to said inlet tube, and said collar means including a pair of hooks on opposite sides of said outlet hose to which said link means is connected.

2. The waste distribution system of claim 1 wherein said annular shoulder means is rigidly connected to said outlet hose.

3. The waste distribution system of claim 1 wherein said link means is one of a pair of link means on opposite sides of said outlet hose and inlet tube.

4. The waste distribution system of claim 3 wherein each of said link means includes a bolt having one end connected to said fastening means and an opposite end connected to one of a pair of chain links connected to said pair of hooks.

5. The waste distribution system of claim 1 wherein said outlet hose and inlet tube are in rotatable telescopic engagement.

6. A waste distribution system including a reservoir of waste, a pump having an inlet hose connected to the reservoir and an outlet hose rotatably connected to an inlet tube on a mobile field spreader through a hose tow swivel comprising, fastening means externally positioned on said inlet tube, annular laterally outwardly extending shoulder means on said outlet hose limited against relative axial movement, collar means on said outlet hose axially outwardly of said annular shoulder for rotational engagement therewith, link means connecting said fastening means to said collar means for pulling said outlet hose while allowing said outlet hose to rotate relative to said inlet tube, and said fastening means including a pair of semicircular sections embracing said outlet hose.

7. The waste distribution system of claim 6 wherein said fastening means further includes a pair of semicircular plates embracing said inlet tube and rotated 90° to said semicircular sections and fastened thereto.

8. The waste distribution system of claim 6 wherein said semicircular sections are of nonmetallic material for reducing rotational friction between said semicircular sections and said annular shoulder.

9. The waste distribution system of claim 7 wherein said fastening means further includes a second pair of semicircular plates embracing said outlet tube and rotated 90° to said first pair of semicircular plates while being in alignment with said semicircular sections and fastened thereto.

10. A hose tow swivel comprising, an outlet hose adapted to be connected to a liquid source, an inlet tube adapted to be connected to a mobile field spreader, fastening means externally positioned on said inlet tube, annular laterally outwardly extending shoulder means on said outlet hose limited against relative axial movement, collar means on said outlet hose axially outwardly of said annular shoulder for rotational engagement therewith, link means connecting said fastening means to said collar means for pulling said outlet hose while allowing said outlet hose to rotate relative to said inlet tube, and said collar means including a pair of hooks on opposite sides of said outlet hose to which said link means is connected.

11. The hose tow swivel of claim 10 wherein said annular shoulder means is rigidly connected to said outlet hose.

12. The hose tow swivel of claim 10 wherein said link means is one of a pair of link means on opposite sides of said outlet hose and inlet tube.

13. The hose tow swivel of claim 10 wherein each of said link means includes a bolt having one end connected to said fastening means and an opposite end connected to one of a pair of chain links connected to one of said hook.

14. The hose tow swivel of claim 10 wherein said fastening means includes a pair of semicircular sections embracing said outlet hose.

15. The hose tow swivel of claim 14 wherein said fastening means further includes a pair of semicircular plates embracing said inlet tube and rotated 90° to said semicircular sections and fastened thereto.

16. The hose tow swivel of claim 14 wherein said semicircular sections are of nonmetallic material for reducing rotational friction between said semicircular sections and said annular shoulder.

17. The hose tow swivel of claim 15 wherein said fastening means further includes a second pair of semicircular plates embracing said inlet tube and rotated 90° to said first pair of semicircular plates while being in alignment with said semicircular sections and fastened thereto.

18. The hose tow swivel of claim 10 wherein said outlet hose and inlet tube are in rotatable telescopic engagement.

* * * * *